United States Patent
Cardona

(10) Patent No.: US 9,625,074 B2
(45) Date of Patent: Apr. 18, 2017

(54) HIGH-PRESSURE FLUID CONDUIT

(71) Applicant: Zena Associates, LLC, Folcroft, PA (US)

(72) Inventor: Robert Cardona, Cinnaminson, NJ (US)

(73) Assignee: Zena Associates, LLC, Folcroft, PA (US)

( * ) Notice: Subject to any disclaimer, the term of this patent is extended or adjusted under 35 U.S.C. 154(b) by 296 days.

(21) Appl. No.: 13/922,794

(22) Filed: Jun. 20, 2013

(65) Prior Publication Data

US 2014/0373944 A1  Dec. 25, 2014

(51) Int. Cl.
  *F16L 37/30*  (2006.01)
  *F16L 55/10*  (2006.01)

(52) U.S. Cl.
  CPC ........... *F16L 37/30* (2013.01); *F16L 55/1007* (2013.01); *Y10T 137/7723* (2015.04)

(58) Field of Classification Search
  CPC ....... F16K 17/36; F16L 11/00; F16L 55/1007; F16L 55/1015; F16L 55/1022
  USPC ............. 137/68.14, 456, 614; 138/106, 109, 138/118.1, 155; 285/1
  See application file for complete search history.

(56) References Cited

U.S. PATENT DOCUMENTS

| | | | |
|---|---|---|---|
| 1,304,364 A | 5/1919 | Phillips | |
| 2,054,561 A | 9/1936 | Greenberg | |
| 2,165,640 A | 7/1939 | Marx | |
| 3,273,578 A | 9/1966 | Clark | |
| 3,630,214 A | 12/1971 | Levering | |
| 3,802,456 A | 4/1974 | Wittgenstein | |
| 3,859,692 A | 1/1975 | Waterman | |
| 3,907,336 A | 9/1975 | Siegmund | |
| 3,913,603 A | 10/1975 | Torres | |
| 4,023,584 A | 5/1977 | Rogers et al. | |
| 4,098,438 A | 7/1978 | Taylor | |
| 4,351,351 A | 9/1982 | Flory et al. | |
| 4,509,558 A | 4/1985 | Slater | |
| 4,614,201 A | * 9/1986 | King et al. | 137/68.15 |
| 4,735,083 A | 4/1988 | Tenenbaum | |
| 4,827,977 A | 5/1989 | Fink, Jr. | |

(Continued)

FOREIGN PATENT DOCUMENTS

WO  2005001327 A1  1/2005

OTHER PUBLICATIONS

Website for HPF, Inc., Breakaway Couplings, www.hpflap.com, HPF, Inc., 13450 Indian Creek, Cleveland, Ohio 44130, Tel: 440-816-2195, 1-800-445-1289, Fax: 440-816-2196, 2 pages, Copyright 2006.

(Continued)

*Primary Examiner* — Kevin Murphy
*Assistant Examiner* — Daniel P Donegan
(74) *Attorney, Agent, or Firm* — Barley Snyder

(57) ABSTRACT

A high-pressure fluid conduit that conducts high-pressure fluid from a high-pressure fluid source to a high-pressure fluid container through a hose unit during open or normal operation. This high-pressure fluid conduit has a safety feature that is activated when the high-pressure fluid conduit fails due to exposure to a predetermined force. The safety feature closes off the flow of high-pressure fluid from the high-pressure fluid source and closes off the escape of high-pressure fluid from the hose unit that entered the hose unit during open or normal operation.

11 Claims, 4 Drawing Sheets

(56) References Cited

U.S. PATENT DOCUMENTS

| | | | |
|---|---|---|---|
| 4,828,183 A | 5/1989 | Fink, Jr. | |
| 4,886,087 A | 12/1989 | Kitchen | |
| 4,896,688 A * | 1/1990 | Richards et al. | 137/68.15 |
| 4,921,000 A * | 5/1990 | King et al. | 137/68.14 |
| 5,054,523 A | 10/1991 | Rink | |
| 5,099,870 A | 3/1992 | Moore et al. | |
| 5,172,730 A | 12/1992 | Driver | |
| 5,250,041 A | 10/1993 | Folden et al. | |
| 5,343,738 A | 9/1994 | Skaggs | |
| 5,357,998 A | 10/1994 | Abrams | |
| 5,427,155 A | 6/1995 | Williams | |
| 5,497,809 A | 3/1996 | Wolf | |
| 5,518,034 A | 5/1996 | Ragout et al. | |
| 5,531,357 A | 7/1996 | Guilmette | |
| 5,551,484 A | 9/1996 | Charboneau | |
| 5,654,499 A | 8/1997 | Manuli | |
| 5,714,681 A | 2/1998 | Furness et al. | |
| 5,765,587 A | 6/1998 | Osborne | |
| 5,803,127 A | 9/1998 | Rains | |
| 5,868,170 A | 2/1999 | Spengler | |
| 5,931,184 A | 8/1999 | Armenia et al. | |
| 6,260,569 B1 | 7/2001 | Abrams | |
| 6,546,947 B2 | 4/2003 | Abrams | |
| 6,692,034 B2 | 2/2004 | Drube et al. | |
| 6,899,131 B1 * | 5/2005 | Carmack et al. | 137/614.04 |
| 7,252,112 B1 * | 8/2007 | Imler et al. | 137/614.04 |
| 7,264,014 B2 * | 9/2007 | Boyd | 137/68.14 |
| 8,336,570 B2 | 12/2012 | Cardona | |
| 8,800,586 B2 * | 8/2014 | Abrams | 137/68.14 |
| 2002/0007847 A1 * | 1/2002 | Abrams | 137/68.14 |
| 2004/0123899 A1 | 7/2004 | Turvey | |
| 2005/0061366 A1 * | 3/2005 | Rademacher | 137/68.14 |
| 2005/0263193 A1 * | 12/2005 | Carmack et al. | 137/614.04 |
| 2008/0035222 A1 * | 2/2008 | Fraser | 137/614.04 |
| 2010/0276008 A1 | 11/2010 | Abrams | |
| 2012/0234423 A1 | 9/2012 | Cardona | |
| 2013/0048110 A1 * | 2/2013 | Wolff | 137/512 |

OTHER PUBLICATIONS

Advertisement, Smalley Wave Springs, www.tfc.eu.com, 4 pages, Copyright 2008-2011.

Website, CSE IPG, Safety Breakaway Coupling, www.cse-ipg.com, 2 pages, Copyright 2000-2010.

PCT Notification of Transmittal, International Search Report and the Written Opinion of the International Searching Authority, International Application No. PCT/US2014/043362, dated Jan. 5, 2015, 8 pages.

PCT Notification of Transmittal, International Preliminary Report on Patentabiity and Written Opinion of the International Searching Authority, International App. No. PCT/US2014/043362, dated Dec. 30, 2015, 6 pages.

* cited by examiner

HIGH-PRESSURE FLUID CONDUIT

FIELD OF THE INVENTION

The present invention relates, in general, to high-pressure fluid delivery and, in particular, to a high-pressure fluid conduit having a safety feature that provides protection against errors by a workman conducting the fluid delivery operation or a failure of the conduit during the fluid delivery operation.

BACKGROUND

When filling containers (e.g., cylinders, tank trucks, rail cars, and stationary tanks) with compressed or non-compressed fluids, both gasses and liquids, or operating equipment that relies on pressurized fluid flow, the fluid is transferred from one container (e.g., a tank truck) to another container (e.g., a stationary tank). Although the fluid can be transferred from one container to another via solid piping, it is common practice in many situations to use a flexible conduit or hose that connects the two containers and through which the fluid is transferred. A flexible hose allows ease of connection/disconnection between the containers, as well as a limited range of motion between the source of the fluid and the destination of the fluid.

For example, compressed or non-compressed gasses, such as oxygen, nitrogen, and carbon dioxide, and liquids, such as chemicals, petroleum and acids, are transported, stored, and used in individual containers of varying size and capacity. In order to fill these containers with the desired product, each container is connected, either singly or in groups, to a fluid filler/seller. In order to connect each container to the filling connection, a flexible hose is used to allow for quick connection/disconnection of the containers to and from the filling connection. A filling station manifold is one example of a filling connection. In addition, operating equipment that runs or uses compressed fluids, such as a forklift or a hydraulic system, also benefits from the ease of use of flexible hoses.

There are various safety risks associated with transferring fluids from one container to another. Service personnel conducting fluid delivery operations might make human errors, such as driving a tank truck away after filling a container without disconnecting the hose from the tank truck and/or the filled container. This situation can create extreme forces on the hose and the attached piping systems that can cause one or more components to fail.

When a hose fails, regardless of the cause of the failure, substantial damage can result in a number of ways. First, if a hose is completely severed, both ends of the hose can whip around wildly under the forces of the compressed fluid that is released from the severed ends. In addition, if a container is not secured, the pressure of the fluid leaving the container can cause the container to move very rapidly in the opposite direction of the escaping fluid. Both of these situations can result in substantial risk of personal injury, as well as property damage. Furthermore, a hose failure will cause leaks from both the delivery and receiving ends, leading to a costly waste of the fluid, as well as the discharge of a hazardous fluid, that has the potential of filling the environment with hazardous or explosive fumes.

When the piping system fails, other related equipment, such as shut-off valves and other fluid controls as well as safety systems, might be damaged, causing extensive property damage and physical injury or loss of life.

SUMMARY

According to the present invention, a high-pressure fluid conduit, adapted for connection between a high-pressure fluid source and a high-pressure fluid container, includes a hose unit having a first end and a second end. This high-pressure fluid conduit also includes a first housing adapted for connection to a high-pressure fluid source and has a first fluid opening through which high-pressure fluid from the high-pressure fluid source enters the first housing, a second fluid opening through which high-pressure fluid from the high pressure fluid source leaves the first housing, and a cavity between the first fluid opening in the first housing and the second fluid opening in the first housing. This high-pressure fluid conduit also includes a second housing abutting the first housing and has a first fluid opening aligned with the second fluid opening of the first housing and through which high-pressure fluid leaving the first housing enters the second housing, a second fluid opening through which high-pressure fluid from the high-pressure fluid source entering the second housing leaves the second housing and enters the hose unit and high-pressure fluid from the hose unit enters the second housing upon separation of the first housing and the second housing. The second housing also has a cavity between the first fluid opening in the second housing and the second fluid opening in the second housing. A high-pressure fluid conduit, constructed in accordance with the present invention, further includes a coupling for coupling the first housing to the second housing and sensing separation of the first housing and the second housing. This coupling has a weakened break-away section that fractures when a predetermined force is applied to the coupling that causes parts of the coupling to separate and permits separation of the first housing and the second housing. Also included in a high-pressure fluid conduit, constructed in accordance with the present invention, are a valve seat at the second fluid opening in the first housing and a valve seat at the first fluid opening in the second housing. A high-pressure fluid conduit, constructed in accordance with the present invention, further includes a first valve body pivotally mounted in the cavity of the first housing and movable between a first position to permit the flow of high-pressure fluid from the high-pressure fluid source through the first housing and a second position against the valve seat in the first housing to prevent high-pressure fluid leaving the first housing and a second valve body pivotally mounted in the cavity of the second housing and movable between a first position to permit the flow of the high-pressure fluid from the high-pressure fluid source through the second housing and a second position against the valve seat in the second housing to prevent the flow of high-pressure fluid from the hose unit leaving the second housing. A high-pressure fluid conduit, constructed in accordance with the present invention, further includes valve control means for retaining the first valve body in its first position and the second valve body in its first position and selectively moving the first valve body towards its second position and the second valve body towards its second position in response to fracture of the coupling and separation of the parts of the coupling.

DETAILED DESCRIPTION OF THE EMBODIMENT

Figure 1:
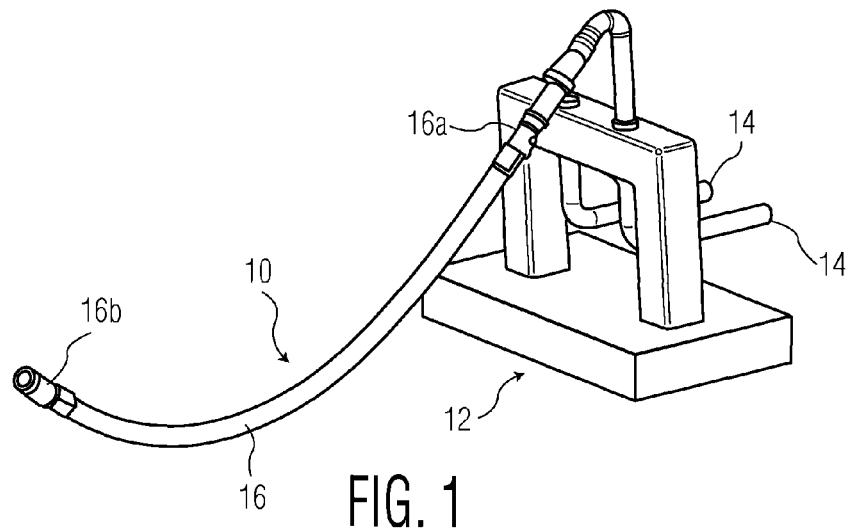
FIG. 1 is a perspective view of a system in which a high-pressure fluid conduit, constructed in accordance with the present invention, is used and illustrates the condition of the high-pressure fluid conduit during open or normal operation.
Figure 2:
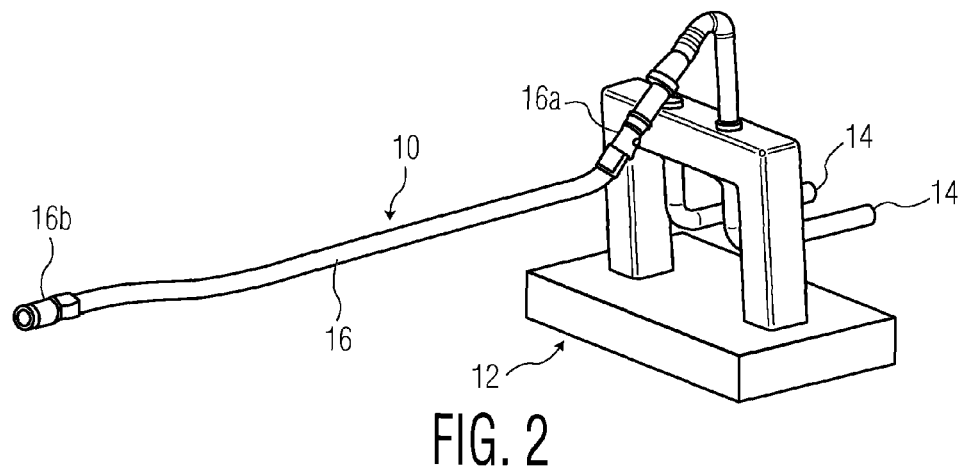
FIG. 2 is a perspective view of a system in which a high-pressure fluid conduit, constructed in accordance with the present invention, is used and illustrates the condition of the high-pressure fluid conduit just prior to a break-away event.
Figure 3:
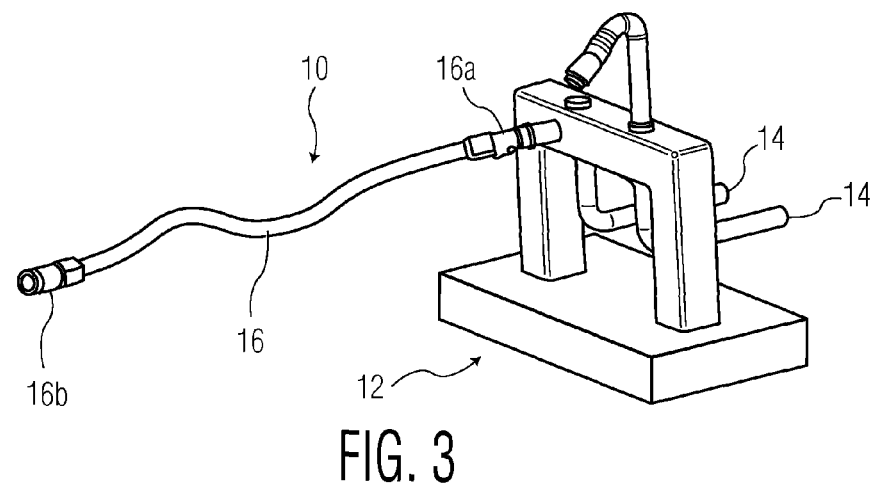
FIG. 3 is a perspective view of a system in which a high-pressure fluid conduit, constructed in accordance with the present invention, is used and illustrates the condition of the high-pressure fluid conduit after a break-away event.

Referring to FIGS. 1, 2, and 3, a high-pressure fluid conduit 10, constructed in accordance with the present invention, is adapted for connection between a high-pressure fluid source, represented by a fixture 12, and a high-pressure fluid container (not shown) to which high-pressure fluid is delivered. Fixture 12 can include a plurality of input conduits 14 that are connected to a stationary tank, for example, that carries a high-pressure fluid and serves as the source of high-pressure fluid that is to be delivered to the high-pressure fluid container, for example, a tank truck.

The high-pressure fluid conduit 10, constructed in accordance with the present invention, includes a hose unit 16 having a first end 16a and a second end 16b. End 16a of hose unit 16 receives high-pressure fluid from the high-pressure fluid source (e.g., a stationary tank) and the high-pressure fluid leaves the hose unit and is delivered to the high-pressure fluid container (e.g., a tank truck) through end 16b of the hose unit.

As shown in FIG. 1, hose unit 16, during open or normal operation, is connected between the high-pressure fluid source and the high-pressure fluid container and high pressure fluid is conducted from the high-pressure fluid source to the high-pressure fluid container with the hose unit laying on a surface or sagging above the surface. As shown in FIG. 2, prior to a break-away event, such as a tank truck driving away before being disconnected from a storage container, hose unit 16 is strained by the force of the tank truck driving away. As shown in FIG. 3, after hose unit 16 has strained a predetermined amount, the hose unit breaks away from fixture 12 at end 16a of the hose unit.

After a break-away event, the flow of high-pressure fluid from the high-pressure fluid source is blocked, for example, by a valve in a housing through which high-pressure fluid previously was conducted to hose unit 16. Back-flow of high-pressure fluid from the high-pressure fluid container into the hose unit at end 16b of the hose unit and the escape of high-pressure fluid in the hose unit prior to the break-away event are blocked, for example, by a valve in a housing through which high-pressure fluid was conducted from the hose unit to the high-pressure fluid container. A high-pressure fluid conduit 10, constructed in accordance with the present invention, serves to block the escape, at end 16a of the hose unit, of high-pressure fluid in the hose unit prior to the break-away event.

Referring to FIGS. 4, 5, 6, and 7, a high-pressure fluid conduit 10, constructed in accordance with the present invention, also includes a first housing 18 adapted for connection to a high-pressure fluid source, such as a tank truck. Housing 18 has a first fluid opening 18a through which high-pressure fluid from the high-pressure fluid source enters housing 18, a second fluid opening 18b through which high-pressure fluid from the high pressure fluid source leaves housing 18, and a cavity 18c between first fluid opening 18a in housing 18 and second fluid opening 18b in housing 18.

A high-pressure fluid conduit 10, constructed in accordance with the present invention, further includes a second housing 20 abutting housing 18. Housing 20 has a first fluid opening 20a aligned with second fluid opening 18b of housing 18 and through which high-pressure fluid leaving housing 18 enters housing 20. Housing 20 also has a second fluid opening 20b through which high-pressure fluid from the high-pressure fluid source entering housing 20 leaves housing 20 and enters hose unit 16 and high-pressure fluid from the hose unit enters housing 20 upon separation of housing 18 and housing 20. Housing 20 also has a cavity 20c between first fluid opening 20a in housing 20 and second fluid opening 20b in housing 20.

Preferably a sealant 21, such as an o-ring, a gasket or a configuration of tightly fitting surfaces, appropriate for the fluid being transferred, is provided at or on the abutting surfaces of housings 18 and 20 for the purpose containing the fluid within the high-pressure fluid conduit during open or normal operation. This sealant permits the abutting surfaces of housings 18 and 20 to separate freely after a break-away event as described below.

A high-pressure fluid conduit 10, constructed in accordance with the present invention, further includes a coupling 22 for coupling first housing 18 to second housing 20 and sensing separation of housing 18 and housing 20. In particular, coupling 22 is fitted in a notch 18d in housing 18 and a notch 20d in housing 20.

Coupling 22, having a weakened break-away section that fractures when a predetermined force is applied to the coupling, serves as a break-away component with parts 22a and 22b that separate permitting separation of first housing 18 and second housing 20 when, for example, the driver of a tank truck fails to disconnect the high-pressure fluid conduit from either the tank truck or a storage container before driving the tank truck away from the storage container. Upon fracture of coupling 22, a safety feature is activated and the high-pressure fluid conduit switches from an open or normal mode of operation to a closed or safety-activated mode of operation.

Figure 7:
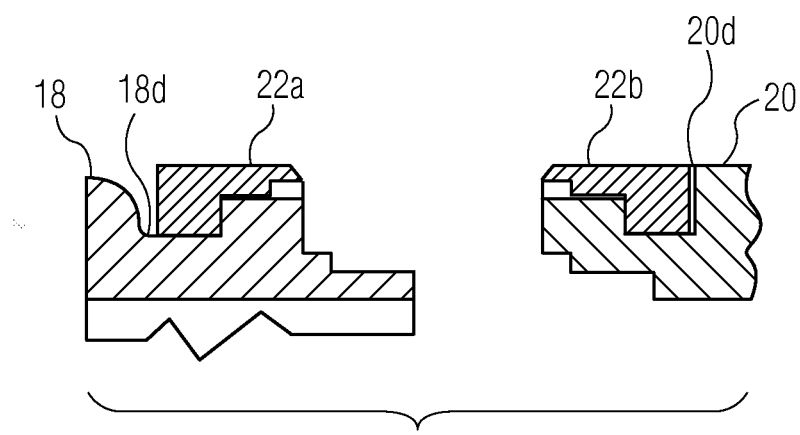
FIG. 7 is a cross-sectional view of the coupling portion of a high-pressure fluid conduit, constructed in accordance with the present invention, and illustrates the condition of the high-pressure fluid conduit after a break-away event.

For the embodiment of the present invention that is illustrated in FIGS. 4, 5, 6, and 7, coupling 22 is an annular ring having a weakened section extending around the annular ring that fractures when a predetermined force is applied to the annular ring that causes first and second parts 22a and 22b of the annular ring, on opposite sides of the weakened section, to separate. The weakened section of annular ring 22, in the form of a continuous groove 22c that extends circumferentially completely around the annular ring, has a reduced thickness, relative to the thickness of first and second parts 22a and 22b of the annular ring. The size, shape, and extent of groove 22c calibrate annular ring 22 to fracture when a predetermined force is applied to the annular ring, whereupon first and second parts 22a and 22b of the annular ring separate as illustrated in FIG. 7. It should be noted that this force, when applied generally along the longitudinal axis of the high-pressure fluid conduit will result in substantially uniform separation of first and second parts 22a and 22b of annular ring 22 along groove 22c, while a force applied at an angle to the longitudinal axis of the high-pressure fluid conduit will result in progressive separation of first and second parts 22a and 22b of the annular ring along groove 22c. For more details about annular ring 22 and the manner in which it functions to couple two parts together and permits the two parts to separate when a predetermined force is applied to the annular ring, reference should be made to U.S. Pat. No. 8,336,570.

To protect against a premature fracture of coupling 22, as might occur when an end of the high-pressure fluid conduit is dropped accidentally, a high-pressure fluid conduit, constructed in accordance with the present invention, preferably includes a shock absorber that protects coupling 22. This shock absorber can be a compressible ring 24 that completely surrounds annular ring 22 and takes up or absorbs the energy that might cause coupling 22 to fracture prematurely.

A high-pressure fluid conduit 10, constructed in accordance with the present invention, further includes a valve seat 26 at second fluid opening 18b in first housing 18 and a valve seat 28 at first fluid opening 20a in second housing 20.

Figure 4:
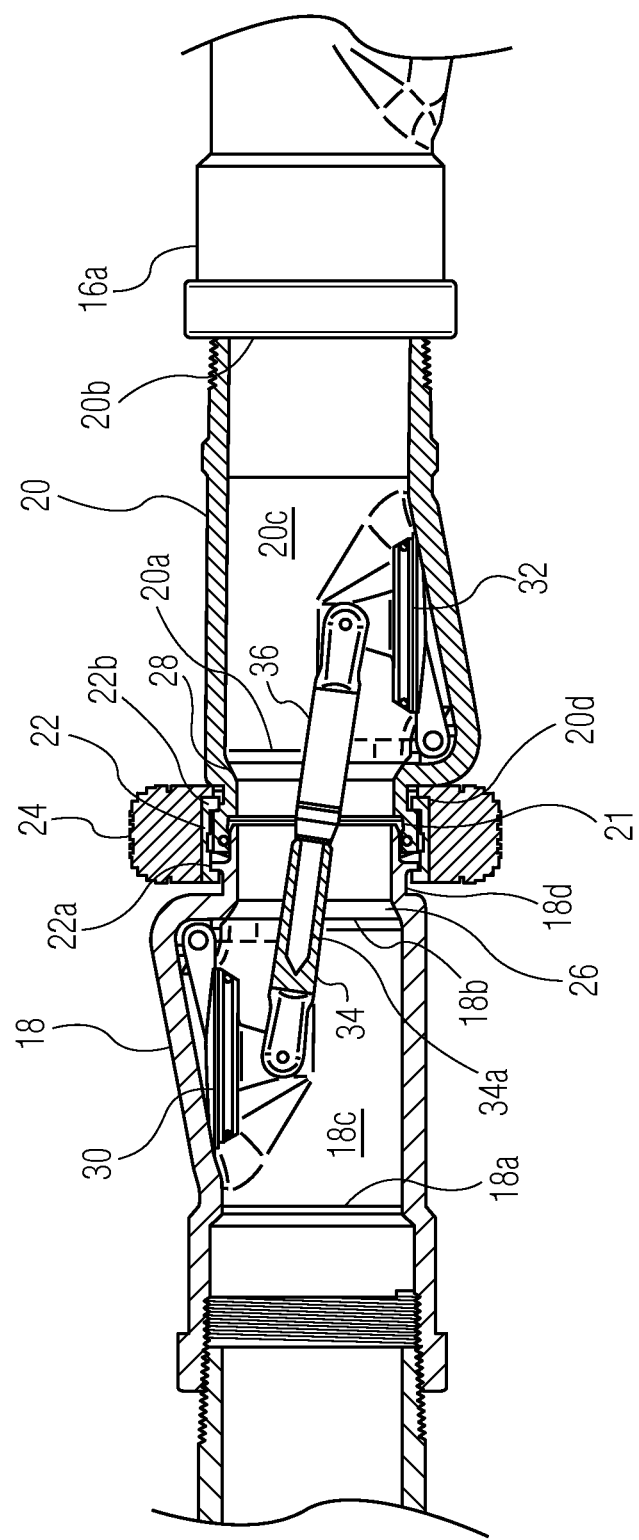
FIG. 4 is a cross-sectional view of a high-pressure fluid conduit, constructed in accordance with the present invention, and illustrates the condition of the high-pressure fluid conduit during open or normal operation.
Figure 5:
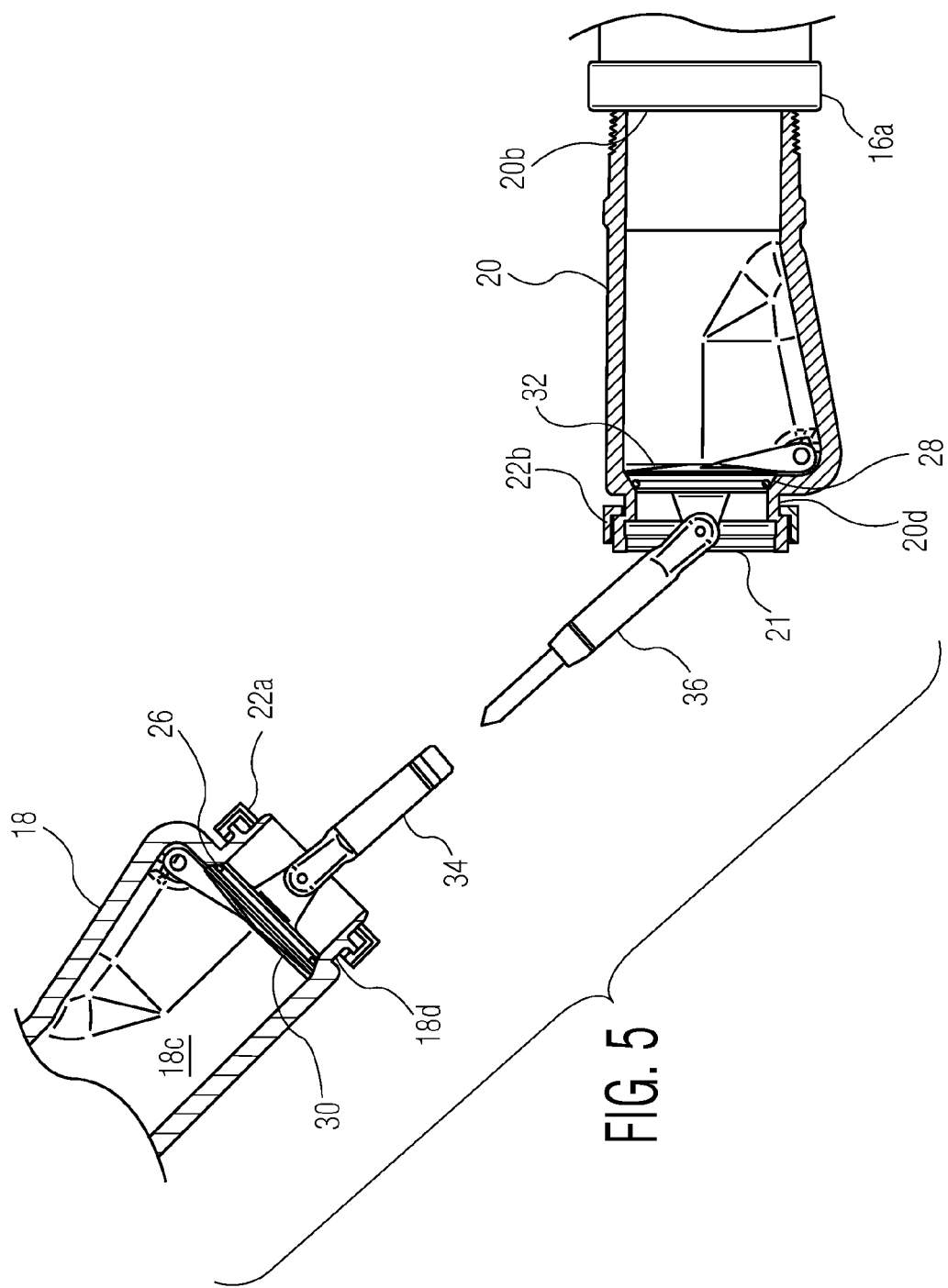
FIG. 5 is a cross-sectional view of a high-pressure fluid conduit, constructed in accordance with the present invention, and illustrates the condition of the high-pressure fluid conduit after a break-away event.
Figure 6:
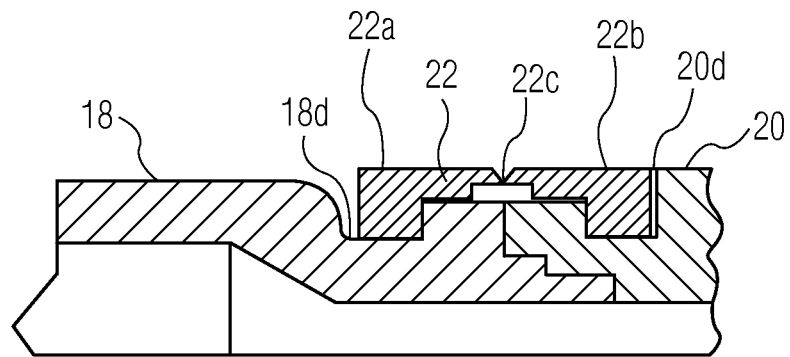
FIG. 6 is a cross-sectional view of the coupling portion of a high-pressure fluid conduit, constructed in accordance with the present invention, and illustrates the condition of the high-pressure fluid conduit during open or normal operation.

A high-pressure fluid conduit 10, constructed in accordance with the present invention, further includes a first valve body 30 that is pivotally mounted in cavity 18c of first housing 18 and is movable between a first position to permit the flow of the high-pressure fluid from the high-pressure fluid source through housing 18, as shown in FIG. 4, and a second position against valve seat 26 in housing 18 to prevent high-pressure fluid leaving housing 18, as shown in FIG. 5.

A high-pressure fluid conduit 10, constructed in accordance with the present invention, further includes a second valve body 32 that is pivotally mounted in cavity 20c of second housing 20 and is movable between a first position to permit the flow of the high-pressure fluid from the high-pressure fluid source through housing 20, as shown in FIG. 4, and a second position against valve seat 28 in housing 20 to prevent the flow of high-pressure fluid from hose unit 16 leaving second housing 20, as shown in FIG. 5.

A high-pressure fluid conduit 10, constructed in accordance with the present invention, further includes valve control means for retaining first valve body 30 in its first position and second valve body 32 in its first position and selectively moving first valve body 30 towards its second position and second valve body 32 towards its second position in response to fracture of coupling 22 and separation of parts 22a and 22b of coupling 22. For the embodiment of the present invention illustrated, the valve control means include a linkage having a first member 34 pivotally secured to first valve body 30 and a second member 36 pivotally secured to second valve body 32 and coupled to and separable from first member 34 of the linkage. Specifically, first member 34 of the linkage and second member 36 of linkage are coupled together by one of the members of the linkage (36 as illustrated) fitted into a bore hole 34a in the other of the members of linkage (34 as illustrated). During open or normal operation, linkage members 34 and 36 are coupled together with linkage member 36 fitted in bore hole 34a of linkage member 34. This fit between linkage members 34 and 36 is such that, upon separation of housings 18 and 20, linkage member 36 withdraws from linkage member 34, so that the two linkage members separate and valve bodies 30 and 32 are permitted to move from their first positions out of the flow of high-pressure fluid through housing 18 and 20, respectively, toward their second positions. The flow of high-pressure fluid through housing 18 from the high-pressure fluid source urges valve body 30 to its second position, namely against valve seat 26, thereby preventing the escape of high-pressure fluid from the high-pressure fluid source from housing 18. The flow of high-pressure fluid through housing 20 from hose unit 16 urges valve body 32 to its second position, namely against valve seat 28, thereby preventing the escape of high-pressure fluid from hose unit 16.

The foregoing illustrates some of the possibilities for practicing the invention. Other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A high-pressure fluid conduit adapted for connection between a high-pressure fluid source and a high-pressure fluid container, said high-pressure fluid conduit comprising:
   a hose unit having a first end and a second end;
   a first housing adapted for connection to a high-pressure fluid source and having:
   (a) a first fluid opening through which high-pressure fluid from the high-pressure fluid source enters said first housing,
   (b) a second fluid opening through which high-pressure fluid from the high-pressure fluid source leaves said first housing, and
   (c) a cavity between said first fluid opening in said first housing and said second fluid opening in said first housing;
   a second housing abutting said first housing and having:
   (a) a first fluid opening aligned with said second fluid opening of said first housing and through which high-pressure fluid leaving said first housing enters said second housing,
   (b) a second fluid opening through which:
      (1) high-pressure fluid from the high-pressure fluid source entering said second housing leaves said second housing and enters said hose unit, and
      (2) high-pressure fluid from said hose unit enters said second housing upon separation of said first housing and said second housing, and
   (c) a cavity between said first fluid opening in said second housing and said second fluid opening in said second housing;
   a coupling:
   (a) for:
      (1) coupling said first housing to said second housing, and
      (2) sensing separation of said first housing and said second housing, and
   (b) having a weakened break-away section that:
      (1) fractures when a predetermined force is applied to said coupling that causes parts of said coupling to separate, and (2) permits separation of said first housing and said second housing;
a valve seat at said second fluid opening in said first housing;
a valve seat at said first fluid opening in said second housing;
a first valve body pivotally mounted in said cavity of said first housing and movable between:
  (a) a first position to permit the flow of the high-pressure fluid from the high-pressure fluid source through said first housing, and
  (b) a second position against said valve seat in said first housing to prevent high-pressure fluid leaving said first housing;
a second valve body pivotally mounted in said cavity of said second housing and movable between:
  (a) a first position to permit the flow of the high-pressure fluid from the high-pressure fluid source through said second housing, and
  (b) a second position against said valve seat in said second housing to prevent the flow of high-pressure fluid from said hose unit leaving said second housing; and
a valve control:
  (a) retaining said first valve body in its first position and said second valve body in its first position, and
  (b) selectively moving said first valve body towards its second position and said second valve body towards its second position in response to fracture of said coupling and separation of said parts of said coupling.

2. A high-pressure fluid conduit according to claim 1 wherein said valve control includes a linkage having:
  (a) a first member pivotally secured to said first valve body, and
  (b) a second member pivotally secured to said second valve body and coupled to and separable from said first member of said linkage.

3. A high-pressure fluid conduit according to claim 2 wherein said first member of said linkage and said second member of said linkage are coupled together by one of said members of said linkage fitted into a bore hole in the other of said members of said linkage.

4. A high-pressure fluid conduit according to claim 1 wherein said coupling is an annular ring having a weakened section extending around said annular ring that fractures when a predetermined force is applied to said annular ring that causes first and second parts of said annular ring on opposite sides of said weakened section to separate.

5. A high-pressure fluid conduit according to claim 4 wherein said weakened section of said annular ring has a reduced thickness, relative to the thickness of said first and second parts of said annular ring, that extends completely around said annular ring.

6. A high-pressure fluid conduit according to claim 5 wherein said weakened section of said annular ring is a continuous groove that extends circumferentially of said annular ring.

7. A high-pressure fluid conduit according to claim 1 wherein said valve control extends through said second fluid opening in said first housing and said first fluid opening in said second housing.

8. A high-pressure fluid conduit adapted for connection between a high-pressure fluid source and a high-pressure fluid container, said high-pressure fluid conduit comprising:
a hose unit having a first end and a second end;
a first housing adapted for connection to a high-pressure fluid source and having:
  (a) a first fluid opening through which high-pressure fluid from the high-pressure fluid source enters said first housing,
  (b) a second fluid opening through which high-pressure fluid from the high-pressure fluid source leaves said first housing, and
  (c) a cavity between said first fluid opening in said first housing and said second fluid opening in said first housing;
a second housing abutting said first housing and having:
  (a) a first fluid opening aligned with said second fluid opening of said first housing and through which high-pressure fluid leaving said first housing enters said second housing,
  (b) a second fluid opening through which:
    (1) high-pressure fluid from the high-pressure fluid source entering said second housing leaves said second housing and enters said hose unit, and
    (2) high-pressure fluid from said hose unit enters said second housing upon separation of said first housing and said second housing, and
  (c) a cavity between said first fluid opening in said second housing and said second fluid opening in said second housing;
an annular ring:
  (1) coupling said first housing to said second housing, and
  (2) sensing separation of said first housing and said second housing, and
  (3) having a weakened break-away section extending around said annular ring that:
    (i) fractures when a predetermined force is applied to said coupling that causes first and second parts on opposite sides of said weakened section of said annular ring to separate, and
    (ii) permits separation of said first housing and said second housing;
a shock absorber surrounding said annular ring;
a valve seat at said second fluid opening in said first housing;
a valve seat at said first fluid opening in said second housing;
a first valve body pivotally mounted in said cavity of said first housing and movable between:
  (a) a first position to permit the flow of the high-pressure fluid from the high-pressure fluid source through said first housing, and
  (b) a second position against said valve seat in said first housing to prevent high-pressure fluid leaving said first housing;
a second valve body pivotally mounted in said cavity of said second housing and movable between:
  (a) a first position to permit the flow of the high-pressure fluid from the high-pressure fluid source through said second housing, and
  (b) a second position against said valve seat in said second housing to prevent the flow of high-pressure fluid from said hose unit leaving said second housing; and
valve control means for:
  (a) retaining said first valve body in its first position and said second valve body in its first position, and
  (b) selectively moving said first valve body towards its second position and said second valve body towards its second position in response to fracture of said coupling and separation of said parts of said coupling.

9. A high-pressure fluid conduit according to claim 8 wherein said shock absorber is a compressible ring that surrounds said annular ring.

10. A high-pressure fluid conduit according to claim 8 wherein said weakened section of said annular ring has a reduced thickness, relative to the thickness of said first and second parts of said annular ring, that extends completely around said annular ring.

11. A high-pressure fluid conduit according to claim 10 wherein said weakened section of said annular ring is a continuous groove that extends circumferentially of said annular ring.

\* \* \* \* \*